(12) United States Patent
Makover et al.

(10) Patent No.: US 8,808,809 B2
(45) Date of Patent: Aug. 19, 2014

(54) METHOD FOR APPLYING HOT MELT ADHESIVE POWDER ONTO A SHOE OR SOLE PART

(71) Applicant: Orisol Asia Ltd., Chang Hwa (TW)

(72) Inventors: Jakov Makover, Maccabim (IL); Bar Cochva Mardix, Tel Avlv (IL); Yaacov Sadeh, Rechovot (IL)

(73) Assignee: Orisol Asia Ltd., Chang Hwa (TW)

( * ) Notice: Subject to any disclaimer, the term of this patent is extended or adjusted under 35 U.S.C. 154(b) by 0 days.

(21) Appl. No.: 14/014,143

(22) Filed: Aug. 29, 2013

(65) Prior Publication Data

US 2014/0093655 A1    Apr. 3, 2014

Related U.S. Application Data

(63) Continuation-in-part of application No. 13/632,949, filed on Oct. 1, 2012, now abandoned.

(51) Int. Cl.

| | | |
|---|---|---|
| *B05D 1/06* | (2006.01) | |
| *B05D 5/10* | (2006.01) | |
| *A43D 25/20* | (2006.01) | |
| *A43D 111/00* | (2006.01) | |
| *A43D 117/00* | (2006.01) | |
| *A43D 25/18* | (2006.01) | |
| *B29L 31/50* | (2006.01) | |

(52) U.S. Cl.
CPC ............... *A43D 25/18* (2013.01); *A43D 25/20* (2013.01); *A43D 111/00* (2013.01); *A43D 117/00* (2013.01); *A43D 25/183* (2013.01); *B29L 2031/504* (2013.01)
USPC ............ 427/475; 427/477; 427/534; 427/558

(58) Field of Classification Search
USPC .................................. 427/475, 477, 534, 558
See application file for complete search history.

(56) References Cited

U.S. PATENT DOCUMENTS

| | | | | |
|---|---|---|---|---|
| 3,996,410 | A * | 12/1976 | Gruetzman | 428/689 |
| 4,901,450 | A * | 2/1990 | Chemello et al. | 36/10 |
| 6,565,927 | B1 * | 5/2003 | Drzal et al. | 427/487 |
| 6,589,606 | B2 * | 7/2003 | Waterkamp et al. | 427/458 |
| 2005/0019529 | A1 * | 1/2005 | Fang | 428/143 |

FOREIGN PATENT DOCUMENTS

GB    1 554 102    * 10/1979

* cited by examiner

*Primary Examiner* — Frederick Parker
(74) *Attorney, Agent, or Firm* — Banger Shia

(57) ABSTRACT

A method for applying hot melt adhesive powder onto a sole or shoe part includes the steps of applying a cleaning agent, irradiating, applying a conductive liquid which has a conductivity at least 100 times higher than purified water which has a conductivity of $5.5 \cdot 10^{-6}$ S/m, spraying hot melt adhesive powder; and heating. The method can save energy, reduce the working space, reduce the labor intensity and improve the working environment by continuously carrying out the spraying and the melting operation of the hot melt adhesive.

4 Claims, 1 Drawing Sheet

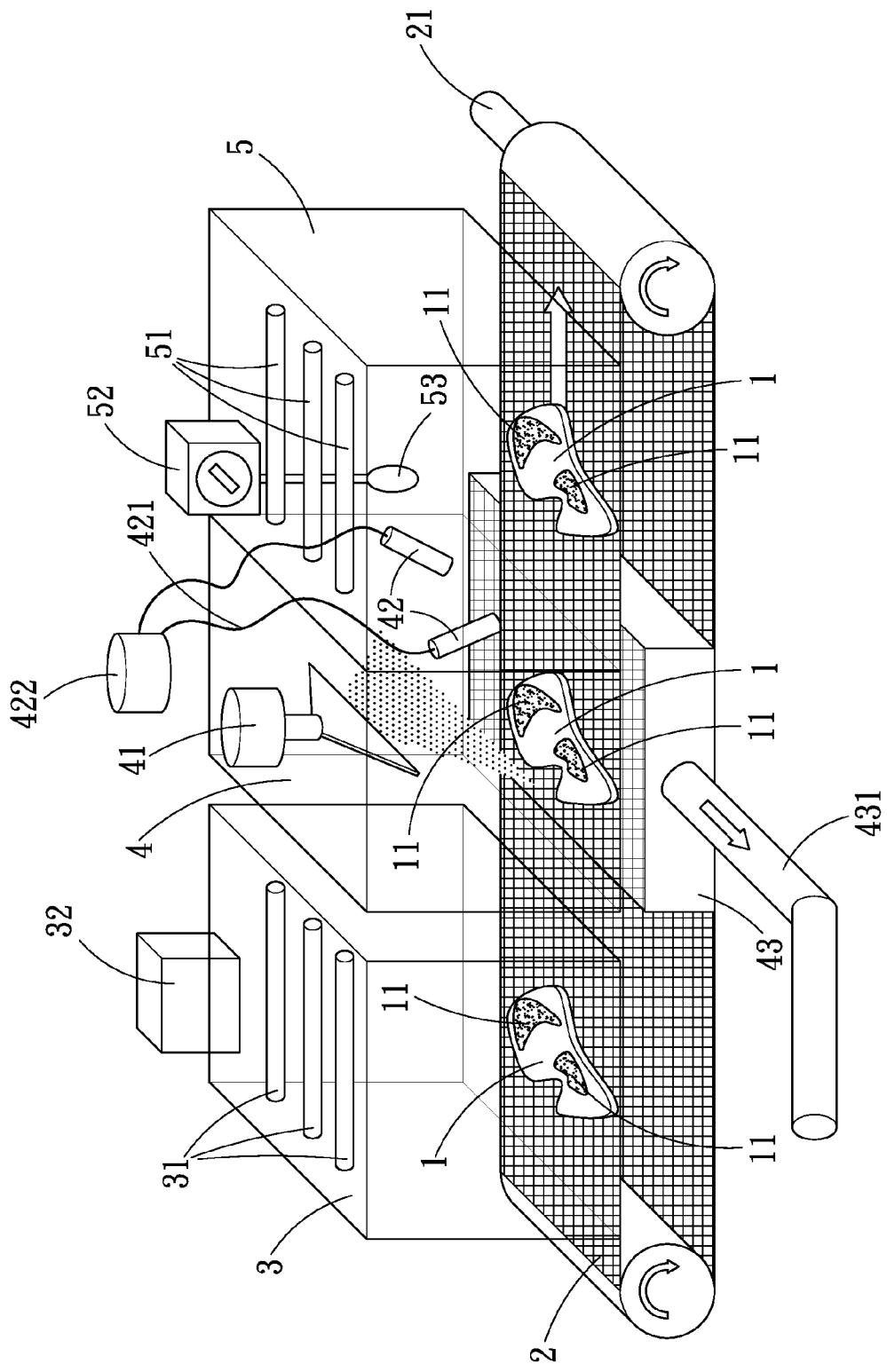

METHOD FOR APPLYING HOT MELT ADHESIVE POWDER ONTO A SHOE OR SOLE PART

This application is a continuation in part of U.S. patent application Ser. No. 13/632,949, which claims the benefit of the earlier filing date of Oct. 1, 2012.

BACKGROUND OF THE INVENTION

1. Field of the Invention

The present invention relates to a method for using hot melt adhesive powder to bond two non-metallic shoe or sole parts, and more particularly to a method for applying hot melt adhesive powder onto a sole surface.

2. Description of the Prior Art

Conventional ways of bonding two non-metallic shoes are mostly to apply liquid adhesive on the to-be-bonded areas of the soles so as to bond them together. The to-be-bonded areas don't have uniform shapes and requires manual effort to apply adhesive, so it is labor-intensive. For example, the gluing of shoe parts and sole parts or the gluing of soles to uppers includes steps of manually applying solvent or water based liquids onto the shoe parts, manually applying the liquid water or solvent based adhesives, and consuming high level of energy to evaporate the water or other non adhesive fluid. Since a common solvent based adhesive contains some toxic substances, such as benzene, formaldehyde, and etc, the working environment is bad for the health of the workers.

The present invention has arisen to mitigate and/or obviate the afore-described disadvantages.

SUMMARY OF THE INVENTION

The primary objective of the present invention is to provide a method for applying hot melt adhesive powder onto sole parts or shoe parts surfaces which can save energy, reduce the working space, reduce the labor intensity and improve the working environment by continuously carrying out the spraying and the melting operation of the hot melt adhesive.

In order to achieve the above objective, the method for applying hot melt adhesive powder onto a sole or shoe part comprises the steps of:

applying a cleaning agent onto a surface of a to-be-bonded shoe;

placing the to-be-bonded shoe in a irradiation chamber and irradiating the surface of the to-be-bonded shoe which has been treated by the previous step with UVC and ozone;

applying conductive liquid which has a conductivity at least 100 times higher than purified water having a conductivity of $5.5 \cdot 10^{-6}$ S/m onto the surface of the to-be-bonded shoe which has been treated by the previous step;

spraying hot melt adhesive powder: charged hot melt adhesive placing the to-be-bonded shoe in a spraying chamber and spraying charged hot melt adhesive powder on the surface of the to-be-bonded shoe which has been treated by the previous step to make the charged hot melt adhesive powder attached onto the to-be-bonded area of the to-be-bonded shoe; and heating the surface of the to-be-bonded shoe which has been treated by the previous step by placing the to-be-bonded shoe in a heating chamber to melt the hot melt adhesive powder.

BRIEF DESCRIPTION OF THE DRAWINGS

FIG. 1 is a schematic view illustrating a system and a method for applying hot melt adhesive powder onto a sole surface.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

FIG. 1 illustrates a method and a system for applying hot melt adhesive powder onto a sole surface.

The system for applying hot melt adhesive powder onto a sole surface comprises a conveyor belt 2, an irradiation chamber 3, a spraying chamber 4 and a heating chamber 5.

The method for applying hot melt adhesive powder onto a sole or shoe part comprises the steps of:

A. applying cleaning agent (available on the market) onto a to-be-bonded sole or shoe part 1 (in the present embodiment, onto a to-be-bonded area 11 of a surface of the shoe part 1) by a brush or a spraying gun;

B. placing the shoe part 1 in the irradiation chamber 3 and irradiating the surface of the shoe part 1 which has been treated by the previous step A with ultraviolet rays and ozone. The irradiation chamber 3 is located above the conveyor belt 2, the shoe part 1 is delivered into the irradiation chamber 3 by the conveyor belt 2. The irradiation chamber 3 is provided with at least one ultraviolet lamp 31, optimally at least one UV-C lamp (three in the present embodiment) inside thereof to irradiate the shoe part 1. The use of the UV-C lamp in collaboration with the primer has proved to replace the use of B-powder, which is used to halogenate rubber prior to cementing and hazardous to human health. The irradiation chamber 3 is further provided with an ozone generator 32 to provide ozone into the irradiation chamber 3 to carry out the UV irradiation in the ozone environment to enhance the irradiation effect. The ozone level inside the chamber 3 can be controlled by the ozone generator 32. To ensure the to-be-bonded area 11 of the shoe part 1 can receive better irradiation effect than the non-cleaned part, the speed of the conveyor belt 2 is adjusted according to the length of the irradiation chamber 3 to ensure the shoe part 1 to be irradiated;

C. applying a high conductive liquid while has a conductivity at least 100 times higher than purified water which has a conductivity of $5.5 \cdot 10^{-6}$ S/m onto the to-be-bonded area 11 which has been treated by the steps A and B by a brush or a spraying gun, and then the shoe 1 which is coated with the high conductive liquid will be placed on the conveyor belt 2 which is driven by a variable speed motor 21 or a driver;

D. spraying hot melt adhesive powder on the to-be-bonded area 11 which has been treated by the steps A, B and C, the hot-met adhesive powder is optimally a polyurethane hot melt adhesive powder or TPU (thermoplastic Polyurethane), which can be melted at a given temperature. The spraying chamber 4 is located above the conveyor belt 2, and the shoe part 1 which has been subjected to irradiation will be delivered into the spraying chamber 4 by the conveyor belt 2, the spraying chamber 4 is provided with at least one spray head 41 (one in the present embodiment) at an upper side thereof. The spray head 41 can charge the hot-met adhesive powder with electrostatic charges and be connected to an air pressurized powder chamber (not shown). The air pressurized powder chamber can deliver the hot melt adhesive powder to the spray head 41 by air pressure first, and then the hot-met adhesive will be charged with the electrostatic charges by the spray head 41 and subsequently sprayed onto the surface of the shoe part 1. Since the to-be-bonded area 11 is coated with the high conductive liquid, the hot-met adhesive powder can be securely adhered onto the to-be-bonded area 11 under the effect of the electrostatic field. The spraying speed and the number of the spray heads 41 can be set according to the speed of the conveyor belt 2 to ensure the hot melt adhesive powder adequately covers the surface of the shoe part 1. The spraying chamber 4 is further provided with at least one blowing device along the conveyor belt 2 (two air nozzles 42 in the present embodiment. After the hot melt adhesive powder is sprayed onto the surface of the shoe part 1. The air nozzles 42 can blow away the hot melt adhesive powder outside the to-be-bonded area 11 on the surface of the shoe part 1, the air nozzles 42 are connected to the air pump 422 through air supplying pipes 421, and the flow speed and the number of the air nozzles 42 can be set according to the speed of the conveyor belt. The direction of the air nozzles can be adjusted according to the position of the shoe part 1 to ensure the hot melt adhesive powder outside the to-be-bonded area 11 on the surface of the shoe part 1 is removed completely. In order to recycle the hot melt adhesive powder which is blown onto the conveyor belt 2, a powder-recycling chamber 43 under the spraying chamber and the conveyor belt 2 is connected to an air pressurized powder chamber (not shown) to recycle the hot melt adhesive powder into the air pressurized powder chamber for reuse by means of vacuum;

E. heating the shoe part 1 which has been treated by the steps A, B, C and D in the heating chamber 5 located above the conveyor belt 2. The heating chamber 5 heats the hot melt adhesive powder on the to-be-bonded area 11 of the shoe part 1 by means of direct irradiation of infrared light, hot air flow, or microwave heating until the powder is melted. In the present embodiment, the heating chamber 5 is provided with infrared lamps 51 at an upper side thereof. The number of the infrared lamps 51 is set according to the temperature required for melting the hot melt adhesive powder and the speed of the conveyor belt 2. The temperature of the heating chamber 5 can be adjusted by a thermostat 52 disposed which controls the ON and OFF of the infrared lamps 51. The thermostat 52 can be installed on the inner surface of the heating chamber 5 or outside the heating chamber 5, optimally outside the heating chamber 5. The thermostat 52 is connected to a temperature sensor 53 disposed in the heating chamber 5 to control the temperature in the heating chamber 5. After being heated by the heating chamber 5, the hot melt adhesive powder on the to-be-bonded area 11 of the shoe part 1 will absorb the heat and then be melted into a liquid adhesive film ready to be bonded.

After the hot melt adhesive powder on the to-be-bonded area 11 of the shoe part 1 is melted, the shoe part 1 will be delivered by the conveyor belt 2 to be bonded to other shoe parts.

The above steps A and B can be combined into a single step by using a mixture of cleaning agent and high conductive liquid, such that the operation process can be simplified, saving the operation time.

With the above method, the hot melt adhesive powder can be automatically sprayed and melted without manual operation, enhancing the degree of automation, reducing the labour intensity and saving energy. In addition, the system of the present invention is provided with the powder-recycling chamber to prevent the escape of the powder, enhancing the utilization ratio of the powder, avoiding the environmental pollution, and protecting the health of the workers.

While we have shown and described various embodiments in accordance with the present invention, it is clear to those skilled in the art that further embodiments may be made without departing from the scope of the present invention.

What is claimed is:

1. A method for applying hot melt adhesive powder onto a sole or shoe part comprising the steps of:
    applying a cleaning agent onto a surface of a to-be-bonded shoe;
    placing the to-be-bonded shoe in a irradiation chamber and irradiating the surface of the to-be-bonded shoe which has been treated by the previous step with UVC and ozone;
    applying conductive liquid which has a conductivity at least 100 times higher than purified water having a conductivity of $5.5 \cdot 10^{-6}$ S/m onto the surface of the to-be-bonded shoe which has been treated by the previous steps;
    placing the to-be-bonded shoe in a spraying chamber and spraying charged hot melt adhesive powder on the surface of the to-be-bonded shoe which has been treated by the previous steps to make the charged hot melt adhesive powder attached onto the to-be-bonded area of the to-be-bonded shoe; and
    heating the surface of the to-be-bonded shoe which has been treated by the previous steps by placing the to-be-bonded shoe in a heating chamber to melt the hot melt adhesive powder.

2. The method for applying hot melt adhesive powder onto a sole or shoe part as claimed in claim 1, wherein the steps of applying cleaning agent and applying the conductive liquid onto the surface of the to-be-bonded shoe are combined into a single step by using a mixture of cleaning agent and conductive liquid.

3. The method for applying hot melt adhesive powder onto a sole or shoe part as claimed in claim 1, wherein the hot melt adhesive powder is a polyurethane adhesive powder.

4. The method for applying hot melt adhesive powder onto a sole or shoe part as claimed in claim 3, wherein the hot melt adhesive powder is a thermoplastic Polyurethane.

* * * * *